UNITED STATES PATENT OFFICE.

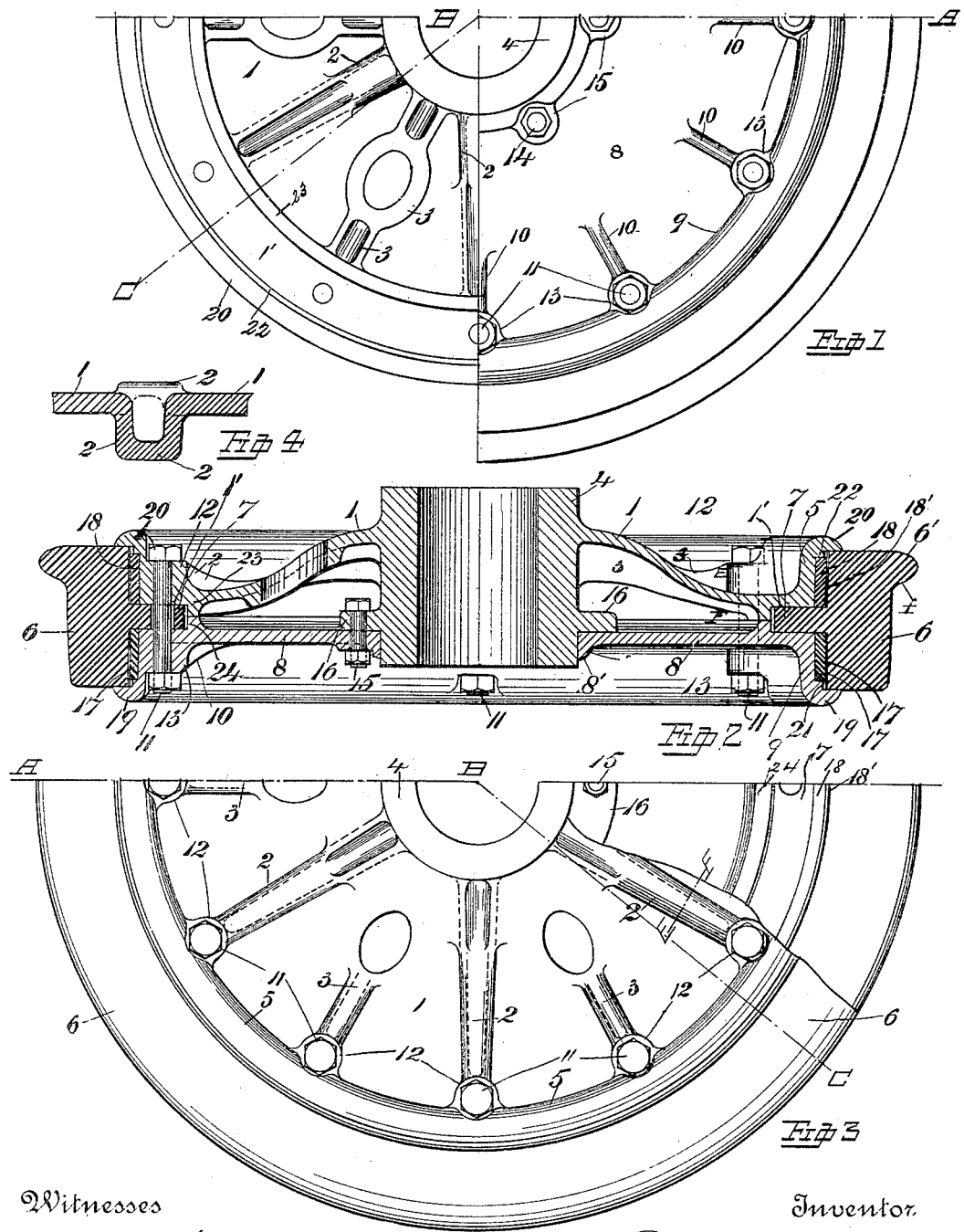

BENJAMIN F. HAUGH, OF INDIANAPOLIS, INDIANA.

CUSHIONED CAR-WHEEL.

SPECIFICATION forming part of Letters Patent No. 467,721, dated January 26, 1892.

Application filed July 6, 1891. Serial No. 398,455. (No model.)

*To all whom it may concern:*

Be it known that I, BENJAMIN F. HAUGH, a citizen of the United States, residing at Indianapolis, in the county of Marion and State of Indiana, have invented new and useful Improvements in Cushioned Car-Wheels, of which the following is a specification.

My invention relates to that class of car-wheels having annular elastic cushions interposed between the tires and the peripheries of their centers; and it consists in a tire having an inwardly-extending flange centrally disposed relatively to the tread thereof and in an improved double-plate disk or center.

The object of my invention is to provide a means of strengthening or reinforcing the tire at the part subjected to the greatest amount of wear; also, to provide means whereby the end-thrust of the tire will be directly applied to the main or back plate of the wheel-center, and thereby relieve the securing-bolts of the tire and center from excessive or undue stress; also, to provide continuous annular safety-strips disposed toward the outer edges of the periphery of the bearing-face of the center, whereby the cushion of the tire is relieved of any excessive compression that may be brought to bear on it, and thus insuring an equal distribution of pressure over the surface of said cushion, thereby materially adding to the life of the latter. I attain these objects by means of the construction of wheel illustrated in the accompanying drawings, in which—

Figure 1 is a part elevation of the outer face of the wheel, showing a part of the removable plate or disk removed. Fig. 2 is a section of the same through the lines A B C. (See Figs. 1 and 3.) Fig. 3 is a part elevation of the inner face of the wheel, showing a portion of the inner or main plate thereof broken off and to exhibit the flange of the tire and the elastic cushion thereof; and Fig. 4 is an enlarged detail section of the reinforcing-rib of the main plate of the wheel-center.

Similar numbers of reference designate like parts throughout the several views.

1 designates the main center or body of the wheel, (preferably of crucible cast-steel,) and having the channel-formed reinforcing-ribs 2, the ribs 3, the hub 4, and the peripheral flange 5, formed thereon and integral therewith.

6 designates the tire, having its tread of the usual or any suitable form and provided with the inwardly-inclined flange 7, formed integral therewith and disposed centrally and between the inner and the outer faces thereof.

8 designates the outer removable plate or disk of the wheel, (preferably of crucible cast-steel,) and having the peripheral flange 9, the ribs 10, and the central reinforcing bearing-ring 8' formed thereon and integral therewith, said outer plate removably secured to the main center plate 1 at the periphery thereof by the bolts 11, passing through the bosses 12 and 13, formed on said center plate 1 and front plate 8, and also secured near its center by the bolts 14, passing through the bosses 15, formed on said plate 8, and the flange 16, formed on the hub 4 and integral therewith.

17 designates the outer and 18 the inner elastic cushions of the wheel, (of any suitable elastic or resilient material, preferably of rubber,) interposed between the inner outwardly tapered or flaring surface of the tire 6 and on opposite sides of the tire-flange 7, and the outer peripheral similary-tapered surfaces of the flanges 5 and 9, and provided with the outer shields 17' and 18' for the purpose of protecting said cushion when forcing the tire on the wheel-center.

19 designates the outer and 20 the inner annular thrust-flanges of the center, extending outwardly therefrom and adapted to neatly clamp the inner and the outer faces of the tire.

21 and 22 are the peripheral safety-guards or annular strips, and 23 and 24 are the flange safety-guards, formed, respectively, on the center plates 1 and 8, and are of an external diameter slightly less than the internal diameter of the inner face of the tire and its flange 7 for the purpose of limiting the amount of play or clearance of the center in the tire, and consequently for resisting any undue stress that might be brought to bear on the wheel to compress the cushion thereof excessively, as by a severe blow caused by the wheel striking a frog or very uneven rail-joint. It will be seen that the holes formed at the periphery of the center plates 1 and 8 neatly fit the securing-bolts 11, whereas the holes formed in the flange 7 are much larger in diameter than the body of the bolt to permit the wheel-center to freely play within the tire in the direction in which the cushion is compressed, thereby avoiding any shearing stress to fall on said bolts, which would soon sever them.

To apply the tire to the wheel center or inner main plate, the cushion 18, with the exterior shield 18′, is first placed around the periphery of the plate 1 and the tire is pressed thereon. The outer plate 8, being encircled with its elastic cushion 17 and shield 17′, is next pressed into the tire from the opposite side thereof its fullest extent, or till contact is obtained with the annular flanges 23 and 24 and the hub-flange 16, after which the securing-bolts 11 and 15 are driven home and secured by their threaded nuts.

It is obvious that a shock or jar caused by any longitudinal blow that may strike the face $f$ of the flange 6′ of the tire will be transmitted and distributed equally between the annular flanges 20 and the flange 7 on and against the side bearing or face 1′ of the wheel-center 1. For this reason I make this member particularly strong and rigid by introducing the reinforcing-ribs 2 and 3, hereinbefore described.

The annular safety strips or shoulders 21 and 22 may be omitted and the cushions made to extend over the bearing-surface of the flanges 5 and 9—that is, entirely over the periphery of the flanges—when it is required to increase the elasticity of the cushion, and consequently the wheel, the amount of compression of said cushion being limited by the flange 7, contacting with the safety-flanges 23 and 24. This construction I prefer to use particularly for wheels destined for easy service.

Having thus described the nature and construction of my invention, what I claim as novel and useful, and desire to cover by Letters Patent of the United States therefor, is—

1. In a cushioned car-wheel, the combination, with the tire and the center thereof, having an inner rigid plate, a hub formed centrally on said plate and integral therewith, and an outer removable plate, of inner and outer thrust-flanges extending outwardly from the bearing-face of said center, inner and outer peripheral safety-shoulders, and an inwardly-projecting flange having its opposite sides parallel formed integral on said tire, said flange interposed between said inner and outer plates of said wheel-center, suitable peripheral elastic cushions interposed between the tire and the bearing-peripheries of said center plates and intercepted by said flange of tire, and suitable means for securing the tire to the center, whereby the latter may be removed from said center while on its axle, substantially as set forth.

2. In a cushioned car-wheel, the combination, with the tire and the center thereof, having an inner rigid plate, a hub formed centrally on said plate and integral therewith, and an outer removable plate, of inner and outer flanges extending outwardly from the bearing-face of said center, an inwardly-projecting flange having its opposite sides parallel, said flange formed integral on said tire and interposed between the inner and the outer plates of said wheel-center, annular safety-flanges formed on the inner faces of said plates and adapted to contact with the inner peripheries of said tire-flange, peripheral or annular elastic cushions interposed between the inner peripheries of said tire and the bearing-peripheries of said center plates and intercepted by said tire-flange, and suitable means for connecting and securing said center plates to the tire and for securing said removable plate to the hub, substantially as set forth.

3. In a cushioned car-wheel, the combination, with the tire and the center thereof, having an annular rigid plate, a hub formed centrally thereon and integral therewith, and an outer removable plate, of inner and outer thrust-flanges extending outwardly from the bearing-faces of said center, inner and outer peripheral safety-shoulders, an inwardly-projecting flange formed on said tire and having its opposite sides parallel, said flange interposed between the inner and outer plates of said center, annular safety-flanges formed on the inner faces of the latter plates and adapted to contact with the inner periphery of said flange of tire, peripheral or annular elastic cushions interposed between the bearing-peripheries of said tires and said center plates and intercepted by said flange of said tire, and suitable means for securing and connecting said center plates to the tire and removable plate to the hub formed on said rigid plate, whereby said outer plate and tire can be removed without disconnecting said inner plate from its axle, substantially as set forth.

4. In a cushioned car-wheel, the combination, with the tire and the center thereof, consisting of a fixed plate 1, a hub 4, formed centrally on said plate and integral therewith, a flange 16, formed on said hub, and a removable plate 8, of the flanges 19 and 20, the safety-shoulders 21 and 22, the tire-flange 7 between said plates, the safety-flanges 23 and 24, the cushions 17 and 18, having the outer shields 17′ and 18′, and suitable peripheral and hub-connecting bolts for securing said tire and removable plate to said center and hub, substantially as described.

5. In a cushioned car-wheel center, the combination, with the main or inner flanged plate or center thereof, having the integral hub 4 formed thereon, of the channel-formed reinforcing-ribs extending radially along the radial lines of the securing-bolts thereof, the collar or outwardly-projecting flange formed on said hub and integral therewith, and a removable outer flange-plate secured centrally to said hub-flange and at its periphery to said rigid center plate and adapted to clamp the flange of said tire, substantially as set forth.

In testimony whereof I have hereunto set my hand in the presence of two subscribing witnesses.

BENJAMIN F. HAUGH.

Witnesses:
THOMPSON R. BELL,
MAURICE ALBRECHT.